United States Patent [19]

Takahashi

[11] Patent Number: 5,144,529
[45] Date of Patent: Sep. 1, 1992

[54] CAPACITOR AND PROCESS FOR PRODUCING SAME

[75] Inventor: Yasunori Takahashi, Tokyo, Japan
[73] Assignee: Fujikin Soft Co., Ltd., Osaka, Japan
[21] Appl. No.: 758,061
[22] Filed: Sep. 12, 1991
[51] Int. Cl.$^5$ .......................... H01G 4/08; H01G 7/00
[52] U.S. Cl. ..................... 361/323; 29/25.42
[58] Field of Search ............... 361/320, 321, 323; 252/62.3; 29/25.42

[56] References Cited

U.S. PATENT DOCUMENTS 3,325,699 6/1967 Hellicar ........................ 361/321
3,720,862 3/1973 Mason ........................ 361/321
4,853,827 8/1989 Hernandez ........................ 361/321

Primary Examiner—Donald A. Griffin
Attorney, Agent, or Firm—Armstrong, Nikaido, Marmelstein, Kubovcik & Murray

[57] ABSTRACT

A capacitor comprising a multiplicity of needlelike metal particles dispersed in a synthetic resin film and so oriented that the axes thereof are positioned in parallel to the surface of the film, and an electrode provided on each of opposite surfaces of the synthetic resin film, the metal particles having a diameter of up to 0.1 μm, a length 5 to 10 times the diameter and a specific surface area of 30 to 100 m²/gr and being covered with a dielectric oxide over the surface thereof.

6 Claims, 1 Drawing Sheet

CAPACITOR AND PROCESS FOR PRODUCING SAME

BACKGROUND OF THE INVENTION

The present invention relates to capacitors.

Various fixed capacitors have been proposed which include aluminum electrolytic capacitors, tantalum capacitors, ceramic capacitors, organic film capacitors, metallized organic film capacitors, etc., whereas capacitors of smaller size and greater capacitance are further required.

SUMMARY OF THE INVENTION

The main object of the present invention is to provide a capacitor which is smaller in size, greater in capacitance and less costly than existing capacitors.

The present invention provides a capacitor which comprises a multiplicity of needlelike metal particles dispersed in a synthetic resin film and so oriented that the axes thereof are positioned in parallel to the surface of the film, and an electrode provided on each of opposite surfaces of the synthetic resin film, the metal particles having a diameter of up to 0.1 μm, a length 5 to 10 times the diameter and a specific surface area of 30 to 100 m²/gr and being covered with a dielectric oxide over the surface thereof.

The capacitor is produced by dispersing a multiplicity of needlelike metal particles in a synthetic resin in a molten state or in the form of a solution, the metal particles having a diameter of up to 0.1 μm, a length 5 to 10 times the diameter and a specific surface area of 30 to 100 m²/gr and being covered with a dielectric oxide over the surface thereof, forming the resin having the metal particles dispersed therein into a thin film, applying magnetic fields of the same polarity to the respective surfaces of the resin film to thereby orient the metal particles so that the axes thereof are positioned in parallel to the surface of the resin film, curing the resin film in this state, and providing an electrode on each of opposite surfaces of the resulting film.

With the capacitor of the present invention, the needlelike metal particle having its surface covered with the dielectric oxide serves as a capacitor by itself. Since a multiplicity of such needlelike metal particles are dispersed as oriented in the synthetic resin film, which is provided with the electrodes on the respective surfaces thereof, the film in the form of a single layer has many capacitors as arranged in layers therein. The present capacitor is therefore compact and yet has a great capacitance. The capacitor is reduced in cost because inexpensive materials are usable. Furthermore, the process for producing the capacitor requires no high-temperature treatment and can therefore be practiced at a lower equipment cost and reduced energy cost.

The present invention will be described in greater detail with reference to the accompanying drawing.

DESCRIPTION OF THE PREFERRED EMBODIMENTS

Figure 1:
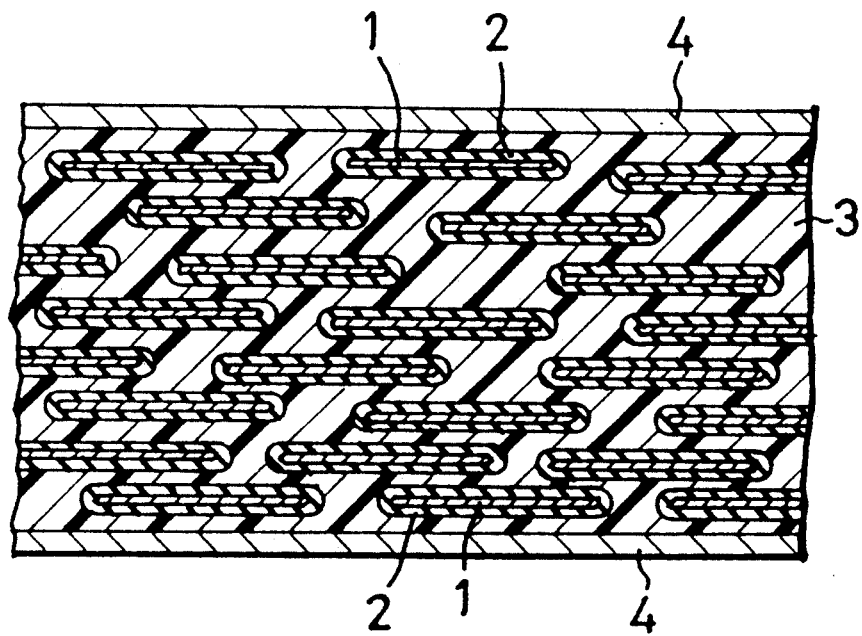
FIG. 1 is a diagram showing the construction of a capacitor embodying the invention.

The capacitor shown in FIG. 1 comprises a multiplicity of needlelike metal particles 1 covered with a dielectric oxide 2 over the surface and dispersed as oriented in a synthetic resin film 3, and electrodes 4 provided on the respective surfaces of the resin film 3.

The needlelike metal particles 1 have a diameter of up to 0.1 μm, a length of 5 to 10 times the diameter and a specific surface area of 30 to 100 m²/gr, and can be obtained easily, for example, by reducing needle crystals of a metal oxide or hydroxide. The diameter, length and specific surface area of needle-like metal particles 1 are limited as stated above because if dimensioned otherwise, metal particles fail to give a satisfactory capacitance.

Needle crystals of a metal oxide, hydroxide or the like which are up to 0.1 μm in diameter, 5 to 10 times the diameter in length and 30 to 10 m²/gr in specific surface area can be prepared by neutralizing an aqueous solution of metal salt, such as iron sulfate, iron chloride or iron nitrate, with an aqueous solution of caustic soda to form a hydroxide while introducing air into the neutralization system. Needle crystals which are uniform in shape and size can then be obtained.

Examples of useful metals are iron, cobalt, nickel, chromium, copper, etc.

Examples of dielectric oxides 2 having a great dielectric constant are $SiO_2$, $TiO_2$, $PbO$, etc.

The surfaces of needlelike metal particles 1 are covered with a coating of dielectric oxide 2 having a great dielectric constant by dipping the metal particles in a solution of an organic Si compound, organic Ti compound, organic Pb compound or the like, drying the particles and thereafter heating the particles at a high temperature.

The needlelike metal particles 1 thus obtained, i.e., those having a diameter of up to 0.1 μm, a length 5 to 10 times the diameter and a specific surface area of 30 to 100 m²/gr and covered with the dielectric oxide 2, can be fixed as dispersed in the synthetic resin film 3 and as so oriented that the axes of the particles are positioned in parallel to the film surface, by dispersing the metal particles 1 in a film forming synthetic resin in a molten state or in the form of a solution, thereafter forming the resin into a thin film of desired thickness, applying magnetic fields of the same polarity, i.e., those of N-N pole or S-S pole, to the respective surfaces of the thin film before the film solidifies to orient the particles 1 horizontally, and thereafter solidifying the thin film.

Examples of useful film forming synthetic resins are epoxy resin, polyurethane resin, polyvinyl alcohol, polyvinyl butyral, ethyl cellulose, acrylic polymer, etc. Such resin is usable as it is, or when required, a solvent, plasticizer, dispersant, etc. can be added to the resin so that the resin can be formed into a film efficiently with the metal particles dispersed therein satisfactorily. Examples of useful solvents are acetone, toluene, methyl ethyl ketone, methanol, ethanol, water, etc. Examples of useful plasticizers are polyethylene glycol, phthalic acid esters and the like. Examples of dispersants usable are those conventionally used, such as glycerin, ethyl oleate and monooleic acid glycerin.

The film forming synthetic resin in a molten state or in the form of a solution is made into a thin film generally with use of a doctor blade. Although it is suitable that the film be 4 to 5 μm in thickness for use in single-layer capacitors, the thickness is not limited to this range.

The synthetic resin is solidified at a temperature which is suitable therefor and which is usually in the range of room temperature to 120° C. There is no need for a high temperature.

The electrodes can be provided on the respective surfaces of the solidified film by a known method such as plating or thermal bonding.

The present invention will be described in greater detail with reference to the following examples, which, however, in no way limit the present invention.

EXAMPLE

An aqueous solution of ferrous sulfate was neutralized with an aqueous solution of caustic soda to form ferrous hydroxide while bubbling air through the neutralization system, whereby needle crystals of goethite (FeOOH), uniform in shape and size, were obtained. The product was reduced with hydrogen, giving needlelike iron particles which were 0.01 $\mu$m in diameter, 0.1 $\mu$m in length and 50.7 m$^2$/gr in specific surface area.

The particulate iron was immersed for 1 hour in a solution (concentration 3%) prepared by diluting an organosilicone compound (ATORON Nsi500, product of Nippon Soda Co., Ltd.) with an acetic acid ester, then dried and thereafter heated at about 600° C. for 2 hours to obtain needlelike iron particles coated with SiO$_2$.

Table 1 shows the magnetic characteristics of these particles.

TABLE 1

| Hc | 880 Oe |
|---|---|
| $\sigma$s | 122 emu/gr |
| $\sigma$r | 61 emu/gr |
| $\sigma$r/$\sigma$s | 0.50 |

The coated particulate iron was dispersed in a liquid epoxy resin, which was then formed into a 1-$\mu$m-thick film using a doctor blade. With magnetic fields of N-N pole applied to the respective surfaces of the film to orient iron particles horizontally, the film was cured at 100° to 120° C. The cured film, 1 $\mu$m in thickness, had the particles as oriented horizontally in 60 to 100 layers.

Twelve pieces of the film were laminated with a comb-shaped electrode interposed between the adjacent layers, a paste containing a copper-nickel alloy as an electrode material was applied to opposite surfaces of the laminate and dried, and the resulting laminate was heated at 600° C. to form external electrodes. The laminate thus prepared was about 1.5 mm in thickness.

The product was cut into chips measuring 3.2±0.2 mm×1.6±0.2 mm, and the chips were tested for characteristics with the result listed in Table 2, which also shows the result obtained by similarly testing conventional ceramic laminate capacitors of the same size as the chip.

TABLE 2

|  | Capacitance |
|---|---|
| Product of invention | 100 $\mu$F |
| Conventional product 1 | 10 $\mu$F |
| Conventional product 2 | 1 $\mu$F |

Table 2 reveals that the capacitor of the invention has 10 to 100 times the capacitance of the conventional ceramic laminate capacitors of the same size as the former.

What is claimed is:

1. A capacitor comprising a multiplicity of needlelike metal particles dispersed in a synthetic resin film and so oriented that the axes thereof are positioned in parallel to the surface of the film, and an electrode provided on each of opposite surfaces of the synthetic resin film, the metal particles having a diameter of up to 0.1 $\mu$m, a length 5 to 10 times the diameter and a specific surface area of 30 to 100 m$^2$/gr and being covered with a dielectric oxide over the surface thereof.

2. A capacitor as defined in claim 1 wherein the needlelike metal particles are prepared by reducing needle crystals of a metal oxide or hydroxide.

3. A capacitor as defined in claim 1 wherein the needlelike metal particles comprise a metal selected from the group consisting of Fe, Co, Ni, Cr and Cu.

4. A capacitor as defined in claim 1 wherein the sythetic resin film comprises a substance selected from the group consisting of epoxy resin, polyurethane resin, polyvinyl alcohol, polyvinyl butyral, ethyl cellulose and acrylic polymer.

5. A capacitor comprising a multiplicity of needlelike metal particles dispersed in each of a plurality of superposed synthetic resin films and so oriented that the axes thereof are positioned in parallel to the surface of the film, and an electrode provided on each of opposite surfaces of each synthetic resin film, the metal particles having a diameter of up to 0.1 $\mu$m, a length 5 to 10 times the diameter and a specific surface area of 30 to 100 m$^2$/gr and being covered with a dielectric oxide over the surface thereof.

6. A process for producing a capacitor characterized by dispersing a multiplicity of needlelike metal particles in a synthetic resin in a molten state or in the form of a solution, the metal particles having a diameter of up to 0.1 $\mu$m, a length 5 to 10 times the diameter and a specific surface area of 30 to 100 m$^2$/gr and being covered with a dielectric oxide over the surface thereof, forming the resin having the metal particles dispersed therein into a thin film, applying magnetic fields of the same polarity to the respective surfaces of the resin film to thereby orient the metal particles so that the axes thereof are positioned in parallel to the surface of the resin film, curing the resin film in this state, and providing an electrode on each of opposite surfaces of the resulting film.

* * * * *